United States Patent [19]

Keeton

[11] 4,347,684
[45] Sep. 7, 1982

[54] HERBICIDE ROW APPLICATOR

[76] Inventor: John H. Keeton, P.O. Box 278, Campbellsville, Ky. 42718

[21] Appl. No.: 184,192

[22] Filed: Sep. 5, 1980

[51] Int. Cl.$^3$ .............................................. A01C 23/00
[52] U.S. Cl. ........................................ 47/1.5; 401/218
[58] Field of Search ...................... 47/1.5, 58; 401/218

[56] References Cited

U.S. PATENT DOCUMENTS

| | | | |
|---|---|---|---|
| 2,528,657 | 11/1950 | Hobe | 401/218 |
| 2,696,696 | 12/1954 | Tigerman. | |
| 2,935,818 | 5/1960 | Crane | 47/1.5 |
| 2,979,757 | 4/1961 | Smith | 47/1.5 |
| 3,037,235 | 6/1962 | Goggans. | |
| 3,138,814 | 6/1964 | Carrona | 401/218 X |
| 3,195,170 | 7/1965 | Howard. | |
| 3,232,006 | 2/1966 | Atherton et al. | |
| 3,246,360 | 4/1966 | Yonkers | 401/218 X |
| 3,255,929 | 6/1966 | De Haan. | |
| 4,012,152 | 3/1977 | Lupkes | 401/218 |
| 4,015,907 | 4/1977 | Lodge. | |
| 4,019,278 | 4/1977 | McKirdy | 47/1.5 |
| 4,187,638 | 2/1980 | Hardy et al. | |
| 4,208,835 | 6/1980 | Roll et al. | 47/1.5 |
| 4,219,964 | 9/1980 | Dale | 47/1.5 |
| 4,263,745 | 4/1981 | Salahshour | 47/1.5 |

FOREIGN PATENT DOCUMENTS 147753  2/1967  New Zealand ....................... 47/1.5

Primary Examiner—James R. Feyrer
Attorney, Agent, or Firm—Cushman, Darby & Cushman

[57] ABSTRACT

A method and apparatus are provided primarily for the application of liquid contact herbicides to plants. A liquid applicator roller is mounted for rotation about a generally horizontal axis and in operative communication with a reservoir of liquid herbicide. The applicator roller is mounted above ground and in position for the peripheral surface thereof to be brought into contact with plants. The applicator roller is moved in the direction generally perpendicular to the axis of rotation of the roller, and powered rotation thereof is effected so that it rotates into contact with plants and continuously transfers liquid from the surface thereof onto the plants, the surface being continuously replenished with liquid from the reservoir. The housing mounting the roller is readily adaptable to mount a hand pushed or pulled unit, or to be mounted on a tractor tool bar. A drive wheel can communicate with a raised surface portion of the liquid applicator roller for effecting rotation thereof. Transfer of herbicide from a liquid pool to the applicator roller can be effected utilizing a sponge or a pair of transfer rollers. The liquid pool is mounted adjacent the axis of rotation of the roller, on one side of the housing.

35 Claims, 6 Drawing Figures

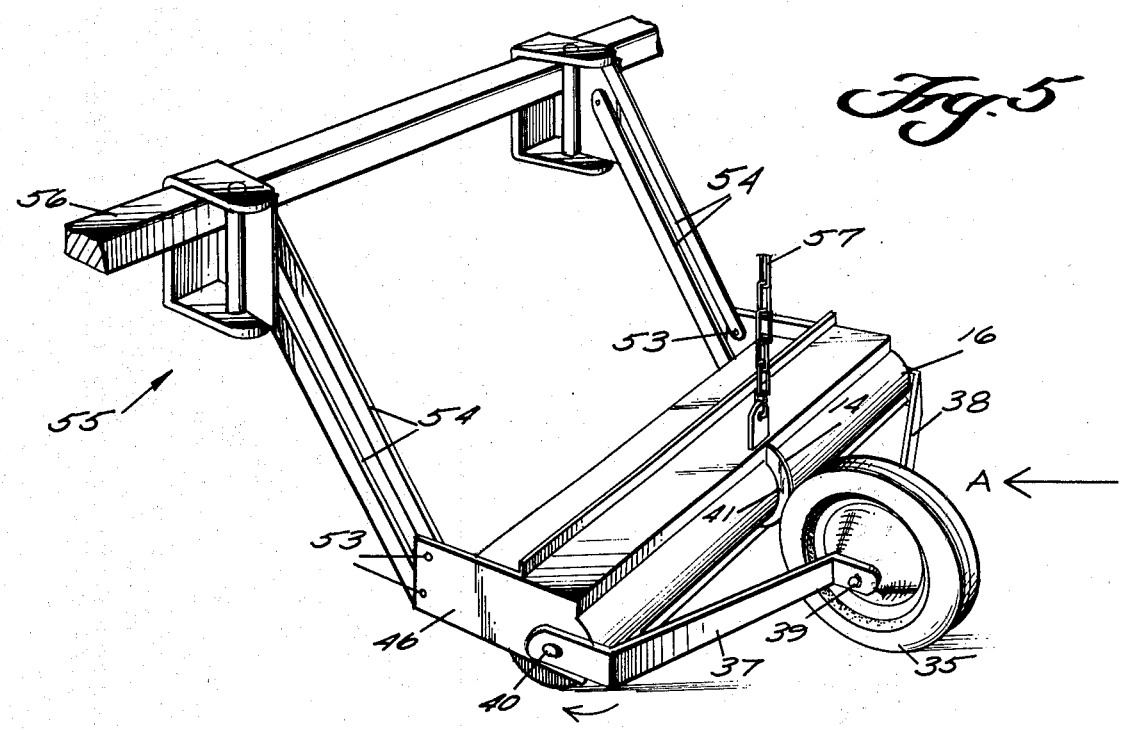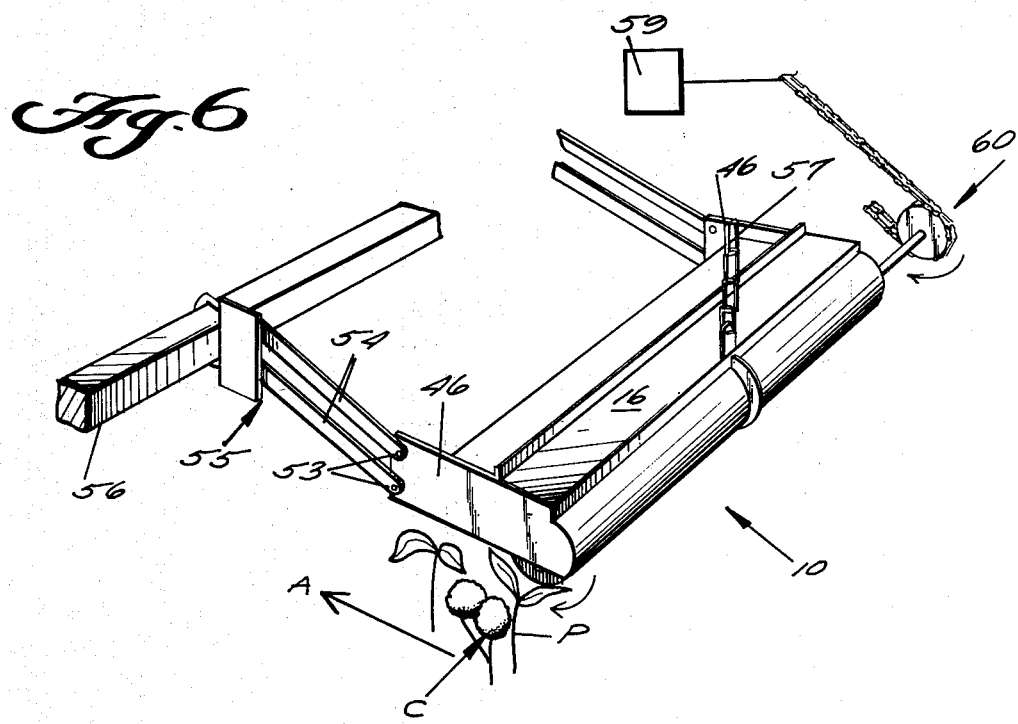

HERBICIDE ROW APPLICATOR

BACKGROUND AND SUMMARY OF THE INVENTION

The invention relates to a method and apparatus for applying liquids to plants. While the apparatus according to the present invention may be utilized to apply a wide variety of chemicals to plants, the apparatus and method are particularly suited for the application of liquid contact herbicides, such as ROUNDUP manufactured by Monsanto Company, to weeds.

Weed control in growing crops is a continuing problem in agriculture, and a great deal of research has been done in that area and there have been many prior art proposals and procedures for the chemical treatment of weeds. Often times one particular structure is utilized for spraying herbicides in the crop rows between plants, and then another structure is utilized for contacting weeds taller than the crop plants.

Conventional overhead herbicide applicators include recirculating sprayers and rope wick applicators. Both structures can be successful if properly utilized, however recirculating sprayers are quite complex with a tendency to clog, and conventional rope wick applicators can apply less than the desired amount of herbicide to plants unless operating parameters are entirely appropriate. Further, neither system is readily adaptable to between row usage.

According to the method and apparatus of the present invention, a rotating roller is utilized as a primary herbicide-applying component. While the utilization of rotating rollers per se has previously been proposed, such proposed structures conventionally have dripped herbicide onto rollers directly in contact with the ground and have been adapted to be rolled over the ground. Such structures therefore have limited utility for the application of herbicide to weeds adjacent crop rows. According to the present invention, a rotating liquid applicator roller is readily utilizable for applying herbicide simply and effectively to weeds between crop rows and to weeds growing above crop rows with equal efficiency. The apparatus according to the invention is readily adapted for mounting to a tractor tool bar, or to be pushed by hand.

According to the method of the present invention, a liquid applicator roller is mounted for rotation about a generally horizontal axis and in operative communication with a reservoir of liquid herbicide. The method includes the steps of: Mounting the applicator roller above the ground and in a position for the peripheral surface thereof to be brought into contact with plants. Effecting movement of the applicator roller in a direction generally perpendicular to the axis of rotation of the roller. And, effecting powered rotation of the applicator roller so that it rotates into contact with plants and continuously transfers liquid from the surface thereof onto the plants, the surface being continuously replenished with liquid from the reservoir. Preferably rotation of the roller is effected in a direction of rotation so that it rotates into plants with which it comes into contact, providing a thorough wiping effect of herbicide onto the plants. The method may be practiced by moving the roller just above ground level between rows of crops, while positively preventing the roller from contacting crops in the rows on either side thereof; or by moving the roller above the tops of the crop plants to contact any plants extending upwardly above the tops of the crop plants.

The apparatus according to the invention includes a liquid applicator roller and a liquid reservoir and means for transferring liquid from the reservoir to the applicator roller surface. The applicator roller preferably comprises a tube of hard plastic having the ends thereof capped with spindles extending outwardly therefrom to define the axis of rotation of the roller. A housing mounts the roller for rotation about a given axis while covering the roller at the top and sides but being open at the bottom to allow the peripheral surface of the roller to rotate out of the housing. The housing also mounts the liquid transferring means. Means are provided for mounting the housing and the roller applicator above the ground, with the axis of rotation of the applicator roller generally horizontal. Preferably a drive wheel is provided, and means are provided for mounting the drive wheel to the housing so that it is rotatable about an axis parallel to the axis of rotation of the applicator roller, with surface means formed on the applicator roller and drive wheel effecting rotation of the applicator roller in response to the rotation of the drive wheel. Preferably the direction of rotation of the applicator roller is opposite to the direction of rotation of the drive wheel.

When the drive wheel is utilized, it is mounted to one side of the housing while the other side of the housing is either mounted to the tractor tool bar or to a pair of ground engaging wheels. Horizontally spaced and elongated plates mounted to the housing adapt the housing for mounting either to a tool bar or to ground engaging wheels. Where a drive wheel is not utilized, the applicator roller may be powered by a motor mounted on a tractor.

A liquid pool is defined within the housing substantially the entire width thereof, corresponding to the applicator roller length. The level of liquid in the pool is substantially even with the axis of rotation of the applicator roller. Transfer of liquid from the pool to the roller may be effected utilizing a sponge, or a pair of transfer rollers. Where the apparatus is utilized between crop rows, preferably a wiper is provided mounted to the housing to wipe any liquid off the roller periphery after plant contact and before a given portion of the roller rotates back into the housing through the housing open bottom. A more remote liquid reservoir may be provided, with a conduit leading from the liquid reservoir to the pool and with a level-responsive valve located in association with the conduit.

It is the primary object of the present invention to provide a method and apparatus for simply, efficiently, and effectively applying a liquid to plants, and particularly for applying a liquid herbicide. This and other objects of the invention will become clear from an inspection of the detailed description of the invention, and from the appended claims.

BRIEF DESCRIPTION OF THE DRAWINGS

FIG. 5 is a perspective view of the basic apparatus of FIG. 1 shown mounted in conjunction with a tractor tool bar; and FIG. 6 is a perspective view of another form of the apparatus according to the present invention shown while in conjunction with a tractor tool bar.

DETAILED DESCRIPTION OF THE DRAWINGS

Figure 2:
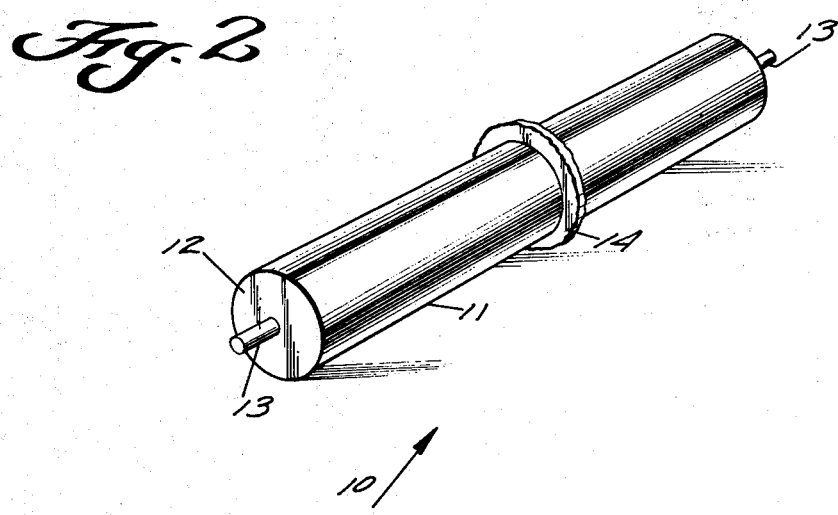
FIG. 2 is a detailed perspective view of an exemplary liquid applicator roller utilized in the apparatus of FIG. 1.

One of the basic components of the apparatus for applying liquid to plants according to the present invention is a liquid applicator roller 10 (see FIGS. 2-4 in particular) for actually contacting plants and transferring liquid from the roller surface 11 to the plants. As illustrated most clearly in FIG. 2, the roller 10 can comprise a hard plastic tube with a pair of end caps 12 with spindles 13 extending outwardly from the end caps and defining the axis of rotation of the roller 11. A raised surface manifestation, such as rough surfaced ring 14 (see FIG. 2) is preferably provided at a central location along the roller 10, for cooperation with a drive wheel as will be hereinafter described.

The liquid applicator roller 10 is mounted within a housing 16, with the spindles 13 extending to side walls of the housing and bearings (not shown) being provided for allowing rotation of the roller 10 with respect to the housing 16. The housing covers the roller 10 on top and along all four sides, however the housing is open at the bottom to allow the peripheral surface of the roller 10 to rotate out of the housing open bottom, as illustrated most clearly in FIGS. 3, 5 and 6.

A liquid reservoir is provided for supplying liquids, such as contact herbicide, to be transferred onto the peripheral surface 11 of the roller 10 to ultimately be moved into contact with plants. Means are provided for defining a liquid pool 18 in the housing extending substantially the entire width of the housing 16, which corresponds to substantially the entire length of the roller 10. The liquid pool 18 could itself comprise the liquid reservoir, however in most situations the amount of liquid in the pool 18 would not be suitable for extended operation of the apparatus. In such cases another remote liquid reservoir 20 (see FIG. 3) would be provided, with a conduit 21 extending from the liquid reservoir to the pool 18. Means are provided for transferring liquid from the reservoir to the applicator roller so that a film of liquid is deposited on the surface 11 just before it contacts plants. Such liquid transferring means may take a wide variety of forms.

Figure 3:
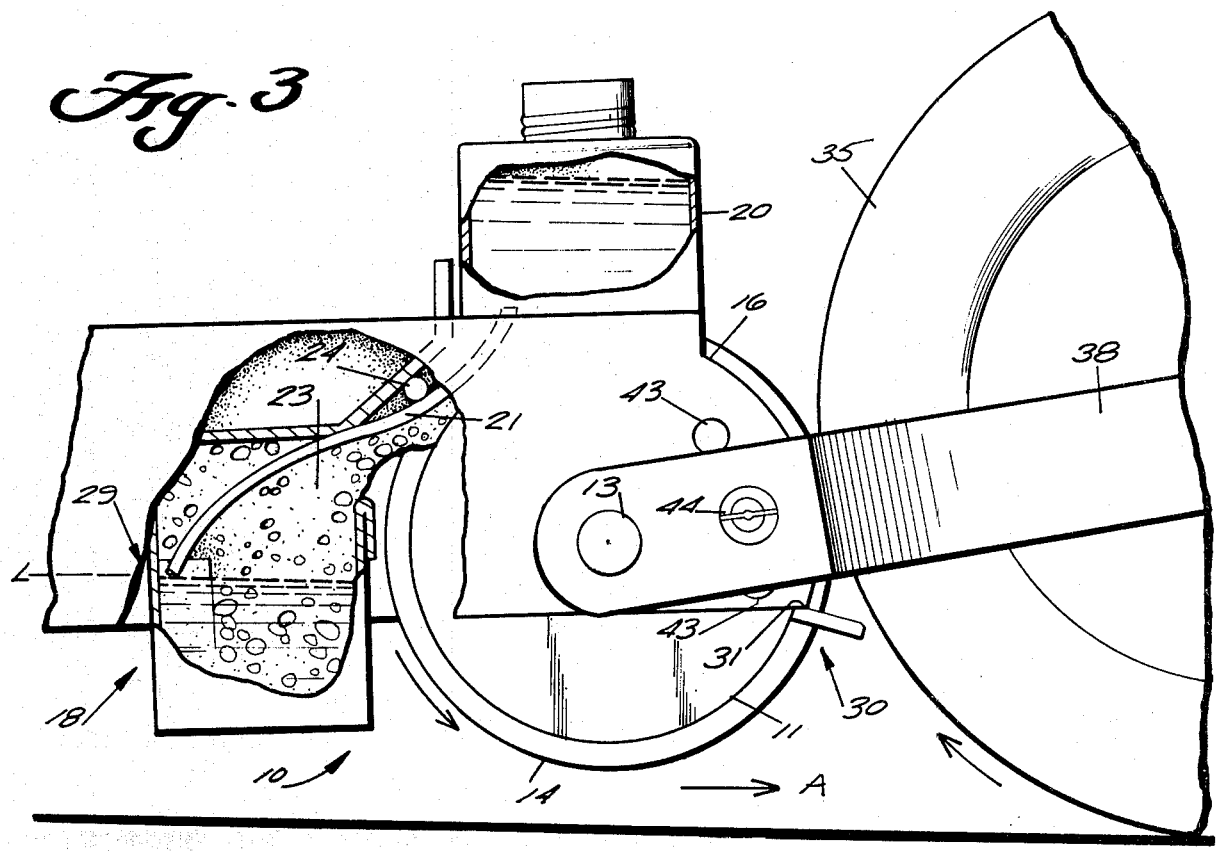
FIG. 3 is a side detailed view, partly in cross-section and partly in elevation, of a modified form of the apparatus of FIG. 1.

One form that the liquid transferring means according to the invention can take, is illustrated in FIG. 3, comprises a sponge 23 disposed in the liquid pool 18 and extending outwardly from the pool into engagement with the periphery 11 of the applicator roller 10. The sponge conducts liquid from the pool 18 up into contact with the roller periphery 11. To insure that the sponge is always moist at the area of engagement with the roller periphery 11, a structure 24, which preferably comprises a tube having a plurality of openings in the bottom thereof, is mounted above the sponge 23 to drip water onto the sponge 23 substantially over the entire width thereof. The tube 24 is preferably in liquid-communicating relationship with the conduit 21, although it can be supplied liquid from another source.

Figure 4:
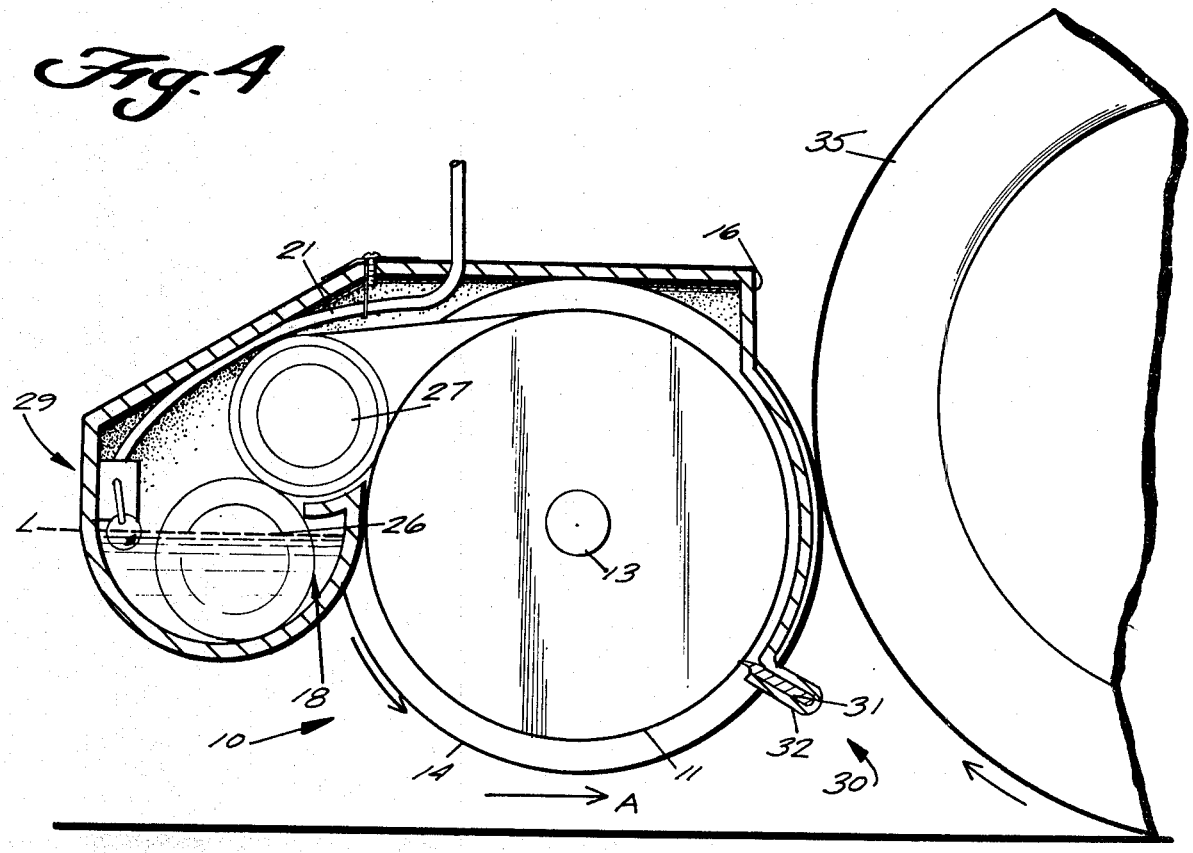
FIG. 4 is a side detailed view, partly in cross-section and partly in elevation, of another modified form of the apparatus of FIG. 1.

Another form that the liquid transferring means may take is illustrated most clearly in FIG. 4, and comprises first and second transfer rollers 26, 27. The first roller 26 is mounted for rotation in the pool 18 and the second roller 27 is mounted for rotation between the pool 18 and the applicator roller 10 and in surface-to-surface contact with both. Both transfer rollers 26, 27 are rotatable about axes parallel to the axis of rotation of the roller 10, and are preferably mounted for this rotation about axles received in sides of the housing 16.

Both with respect to the FIGS. 3 and 4 embodiment, where a remote liquid reservoir 20 is provided, the liquid transferring means includes—in addition to the transfer means which comprise the sponge 23 or the rollers 26, 27—the conduit 21 and valve means, illustrated generally at 29, responsive to the level L of liquid within the pool 18, for preventing or allowing flow of liquid through the conduit 21 to the pool 18 in response to the level of liquid in the pool. The valve means may comprise a conventional float operated valve. Preferably the liquid pool 18 is positioned in the housing 16 adjacent one side of the roller 10, and the valve means 29 are actuated so that the liquid level L maintained in the pool 18 is at about the same horizontal level as the axis of rotation of the roller 10 (see FIGS. 3 and 4).

In normal usage, the peripheral surface 11 of applicator roller 10 will not come into contact with the ground. However, where the apparatus is utilized so that the roller surface 11 will be close to the ground (e.g. between crop rows) it is desirable to provide some accessory mechanism to prevent carrying dirt back to the liquid transfer means (e.g. sponge 23 or transfer rollers 26, 27). This is accomplished by providing wiper means 30 positioned at the bottom of the housing 16 at the re-entry area of the roller periphery 11 into the housing 16 having once passed through the open bottom thereof. The wiper means 30 may comprise a wiper blade 31, for instance of rubber or like flexible, resilient material, removably mounted in housing lip 32. The blade 31 wipes all the liquid off and lets it fall to the ground to prevent carrying dirt into the housing 16. If desired, a similar wiper mounting structure 32 can be mounted on the opposite side of the roller 10 in case the roller 10 is utilized so that it is rotated in the opposite direction to that indicated in FIGS. 3 and 4. Only one wiper blade 31 is utilized at a time.

Means are also provided for mounting the housing 16 and roller 10 so that they are spaced from the ground, with the axis of rotation of the roller 10 being generally horizontal, and so that the roller 10 is positively rotated. One structure particularly useful for facilitating both of these functions is the drive wheel 35 illustrated in FIGS. 1, 3, 4 and 5. The drive wheel 35 is substantially larger in diameter that the applicator roller 10, and the peripheral surface thereof and the raised portion 14 of the roller 10, together, comprise surface means for effecting rotation of the roller 10 in response to rotation of the drive wheel 35, the roller 10 being driven by the drive wheel 35. The roller 10 is rotated by the drive wheel 35 in a direction of rotation opposite to the direction of rotation of the drive wheel 35. The drive wheel 35 engages the ground, being either pushed or pulled by an operator or by a tractor to which it is operatively mounted, and moves in the direction A (see FIGS. 3-6 in particular), which means that the direction of rotation of the roller 10 is such that it rotates into plants with which it comes in contact, providing a thorough wiping effect of liquid onto the plants.

A preferred means for mounting the drive wheel 35 to the housing 16 comprises a pair of bracket arms 37, 38, each mounted at one end thereof to an axle 39 for the drive wheel 35 so that the drive wheel 35 is rotatable with respect thereto, and pivotally mounted by pivot pins 40 or the like at the opposite ends thereof to the casing 16. Means are provided defining an interior slot 41 in the casing 16 through which the raised portion 14 of the roller 10 extends to engage the periphery of the drive wheel 35.

As illustrated in FIG. 3, means also are preferably provided for adjustably mounting at least one of the arms 37, 38 intermediate its ends to the housing 16 so that it is held stationary with respect to the housing at that point. This is preferably accomplished by providing a plurality of openings 43 in one or both side walls of the housing 16, with a corresponding opening formed in the arm 37, 38 corresponding thereto, and a nut and bolt assembly 44 passing through the openings and affixing the lever 37, 38 to the housing 16 at the area. By selecting the appropriate opening 43, the spacing of the roller 10 off the ground may be adjusted to accommodate different terrain, vegetation or like conditions.

Figure 1:
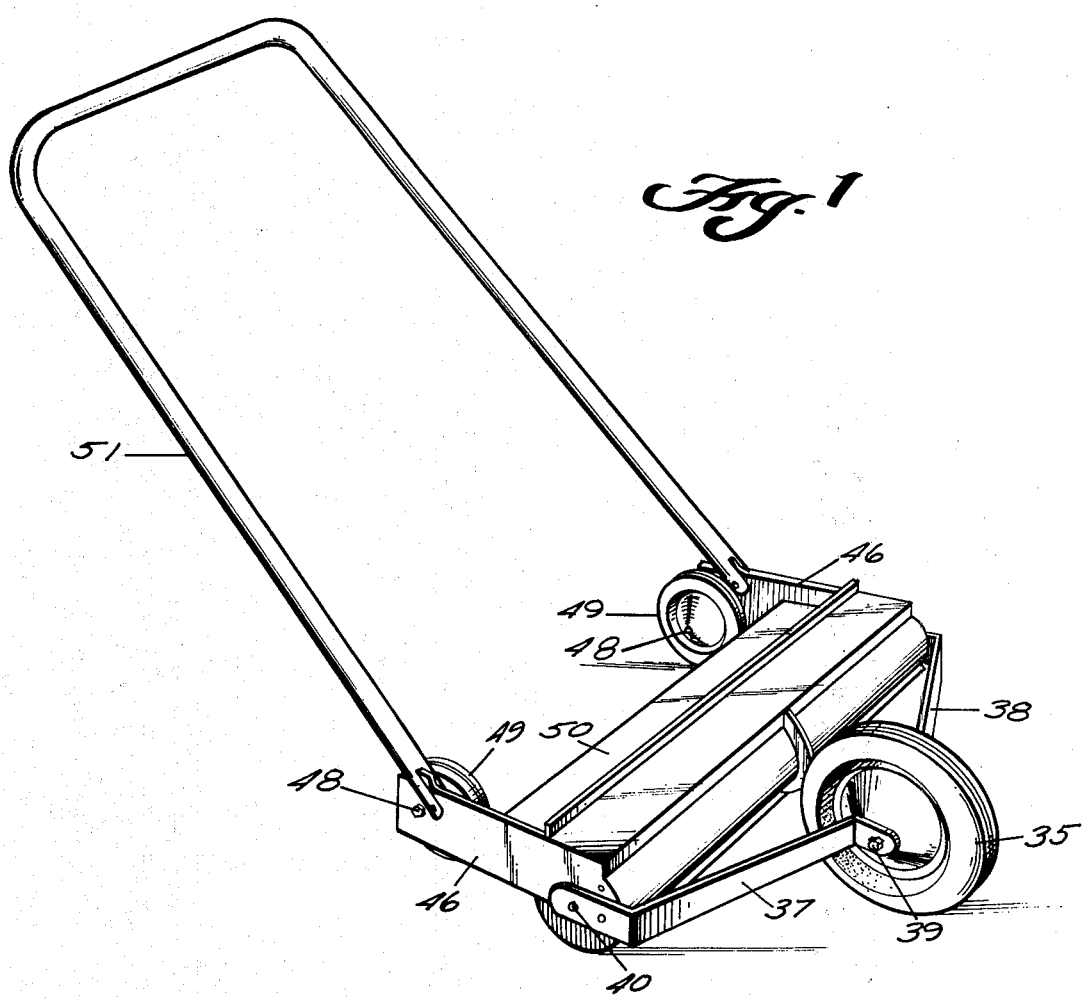
FIG. 1 is a perspective view of an exemplary apparatus according to the present invention.

Further means for mounting the housing 16 and roller 10 so that they are spaced from the ground are utilized in addition to, or in place of, the drive wheel 35. In order to provide the most adaptable structure possible, preferably a pair of horizontally spaced substantially horizontally elongated plates 46 are mounted to the housing 16 on an opposite side thereof as the drive wheel 35. Each plate 46 has bore means formed therein adapted to receive the axle of a ground engaging wheel, or a pivot pin for a lever. Where it is desirable to use the apparatus to be pushed or pulled by hand, as illustrated in FIG. 1, the axles 48 of a pair of small ground engaging wheels 49 are received by the bore means (e.g. bore 50) provided in the plates 46, serving to space the side of the housing 16 opposite the drive wheel 35 off of the ground. In this embodiment a handle 51 also is provided connected to the plates 46 and extending upwardly therefrom, as illustrated in FIG. 1.

Where it is desirable to mount the apparatus to a tractor tool bar, the bores 50 and the plates 46 receive pivot pins 53 at one end of each of the levers 54, the levers 54 (see FIGS. 5 and 6 in particular) having means, such as conventional brackets 55, formed at the opposite ends thereof for mounting on a tractor tool bar 56. The brackets 55 of course are adjustable along the length of the tool bar 56 to mount the apparatus in any desired position. In such embodiments, a chain 57 or like structure might also be provided for mounting to the tractor to lift the entire structure 16 into an inoperative position, or effect adjustment of the height thereof (where the adjustment means 43, 44 are not utilized but rather the bracket arms 37, 38 are pivoted at both ends thereof to the housing 16 and drive wheel 35, respectively).

In the embodiment illustrated in FIG. 6, the drive wheel 35 has been disconnected. The roller 10 is thus no longer driven by the drive wheel 35, but instead is driven by a small motor, illustrated schematically at 59 in FIG. 6, mounted on the tractor, with a chain and sprocket arrangement 60, or like means, effecting rotation of the roller 10 in the direction indicated by the arrows in FIG. 6. Instead of a motor 59, driving of the roller 10 may be effected utilizing a PTO shaft from the tractor, with suitable adapting apparatus. Of course any number of housing 16 with rollers 10 can be mounted along the tool bar 56, positioned at various vertical heights or with various spacings dependent upon whether between-row or above-row treatment is to be effected (or both at the same time with alternate units positioned in alternate manners).

The apparatus heretofore described is most suitable for use in the application of liquid contact herbicides, such as ROUNDUP manufactured by Monsanto Company, to plants to effect destruction of the plants. A preferred method according to the present invention comprises (or consists of) the following steps:

(a) Mounting the applicator roller 10 above the ground in a position for the peripheral surface 11 thereof to be brought into contact with plants (e.g. see plants P in FIG. 6). The applicator roller 10 is in operative communication with a reservoir of liquid herbicide such as the liquid pool 18 and/or the remote reservoir 20. The reservoir 20 may be located at any remote location desired (such as a large tank on a tractor).

(b) Effecting movement of the applicator roller 11 in a direction A generally perpendicular to the axis of rotation (along spindles 13, 13) of the roller 10. This may be accomplished by pushing or pulling the handle 51 attached to the housing 16, or driving the tractor on which tool bar 56 is mounted in direction A. This step also may be practiced by moving the roller 10 just above ground level between rows of crops (e.g. see FIGS. 3 and 4) while positively preventing the roller from contacting crops in the rows (with the housing 16 sidewalls, or further auxillary guards if desired), or by moving the roller above the tops of crop plants (see C in FIG. 6) to contact any plants (see weeds P in FIG. 6) extending upwardly above the tops of the crop plants. When the roller 10 is positioned just above the ground, the further step of wiping the surface 11 of the roller 11 after it has come into contact with the plants, and before it has returned to be replenished by the liquid from the other reservoir, utilizing wiper blade 31, is also practiced.

(c) Effecting powered rotation of the applicator roller so that it rotates to contact plants and continuously tranfers liquid from the surface 11 thereof onto the plants, the surface 11 being continuously replenished with liquid from the reservoir (e.g. 18 via sponge 23 or transfer rollers 26, 27). This step is preferably practiced by effecting rotation of the roller in a direction of rotation (see FIGS. 3-6) so that it rotates into plants with which it comes into contact, providing a thorough wiping effect of liquid herbicide onto the plants.

It will thus be seen that according to the present invention apparatus has been provided which can efficiently, simply and effectively apply liquid to plants, particularly in practicing a method of applying liquid contact herbicide to plants. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for applying liquid to plants, comprising
a liquid applicator roller for contacting plants and transferring liquid from the roller surface to the plants;
a liquid reservoir;

means for transferring liquid from said reservoir to said applicator roller so that a film of liquid is deposited on said applicator roller surface just before it contacts plants;

a housing for mounting said roller for rotation about a given axis, and covering said roller at the top and sides but being open at the bottom to allow the peripheral surface of the roller to rotate out of the housing open bottom, and mounting said liquid transferring means; and means for mounting said housing so that it is spaced from the ground, and so that said applicator roller is rotatable about a horizontal axis and is spaced from the ground, said mounting means including a pair of horizontally spaced substantially horizontally elongated plates mounted to said housing and extending from one end thereof, each plate having bore means formed therein for receiving mounting pin means.

2. Apparatus as recited in claim 1 wherein said housing mounting means further comprise a pair of wheels and a pair of axles, one associated with each wheel; each of said bore means in said plates receiving one of said axles for mounting a said wheel for rotation with respect to said plate, with the wheel in contact with the ground.

3. Apparatus as recited in claim 2 further comprising a handle operatively attached to each of said plates and extending upwardly therefrom.

4. Apparatus as recited in claim 1 wherein said housing mounting means further comprise a pair of levers, one mounted at one end thereof by a pivot pin to said plates, the pivot pins being received by said bore means; and means for mounting said levers at the other ends thereof to a tractor tool bar.

5. Apparatus as recited in claim 4 wherein said housing means further comprise force applying means, mounted to said housing on the opposite side thereof as said levers for applying an upward force to said housing.

6. Apparatus as recited in claim 2 wherein said housing mounting means further comprise a pair of bracket arms extending outwardly from a side of said housing opposite said plates, and mounting a ground-engaging wheel.

7. Apparatus for applying liquid to plants, comprising
a liquid applicator roller for contacting plants and transferring liquid from the roller surface to the plants;

a housing for mounting said roller for rotation about a given axis, and covering said roller at the top and sides but being open at the bottom to allow the peripheral surface of the roller to rotate out of the housing open bottom;

means defining a liquid pool in said housing extending substantially the entire width of said housing and extending substantially the entire length of said applicator roller;

transfer means disposed in said liquid pool and extending outwardly from said liquid pool into engagement with the peripheral surface of said applicator roller for depositing a film of liquid on said applicator roller surface just before it contacts plants; and means for mounting said housing so that it is spaced from the ground and movable with respect to the ground in a direction generally perpendicular to said axis of rotation of said applicator roller, and so that said applicator roller is spaced from the ground and said axis of rotation thereof is horizontal.

8. Apparatus as recited in claim 7 wherein said transfer means comprises a sponge disposed in said liquid pool and extending outwardly from said liquid pool into engagement with the peripheral surface of said applicator roller.

9. Apparatus as recited in claim 7 wherein said transfer means comprises first and second transfer rollers, said first roller mounted for rotation in said pool and said second roller mounted for rotation between said pool and said applicator roller, and in surface-to-surface contact with said first roller and said applicator roller, both said transfer rollers being rotatable about axes parallel to the axis of rotation of said applicator roller.

10. Apparatus as recited in claims 8 or 9 further comprising a liquid reservoir, and means for transferring liquid from said liquid reservoir to said liquid pool, said means for transferring liquid comprising a conduit extending from said liquid reservoir to said pool; and valve means associated with said conduit for controlling flow of liquid through said conduit to said pool in response to the level of liquid in said pool.

11. Apparatus as recited in claim 10 wherein said liquid pool is located adjacent one side of said applicator roller, and wherein said valve means comprises means for maintaining the level of liquid in said pool at about the same horizontal level as the axis of rotation of said applicator roller.

12. Apparatus as recited in claim 7 wherein said means defining a liquid pool in said housing locates said pool on one side of said housing, the pool being at the same general horizontal level as said applicator roller.

13. Apparatus as recited in claim 7 further comprising wiper means mounted to said housing and engaging the peripheral circumferential surface of said applicator roller and for wiping off any liquid at a particular area of engagement on said applicator roller surface before said applicator roller particular point returns from a position exterior of said housing to a position interior of said housing.

14. Apparatus as recited in claim 8 further comprising a liquid containing structure mounted above said sponge adjacent the portion thereof engaging said applicator roller, and means defining a plurality of openings in the bottom of said structure to drip liquid onto said sponge.

15. Apparatus for applying liquid to plants, comprising:
a liquid applicator roller for contacting plants and transferring liquid from the roller surface to the plants;
a liquid reservoir;
means for transferring liquid from said reservoir to said applicator roller so that a film of liquid is deposited on said applicator roller surface just before it contacts plants;
a housing for mounting said roller for rotation about a given axis, and covering said roller at the top and sides but being open at the bottom to allow the peripheral surface of the roller to rotate out of the housing open bottom, and for mounting said liquid transferring means;
means for mounting said housing so that it is spaced from the ground and movable with respect to the ground in a direction generally perpendicular to said axis of rotation of said applicator roller, and so that said applicator roller is spaced from the ground and said axis of rotation thereof is horizontal; and means for driving said applicator roller in a direction so that it rotates into plants with which it comes into contact, providing a thorough wiping effect of liquid on the plants.

16. Apparatus as recited in claim 15 wherein said driving means comprise a motor mounted for movement with said housing, and means operatively interconnecting said motor to said liquid applicator roller so that operation of said motor effects rotation of said liquid applicator roller.

17. Apparatus as recited in claim 15 further comprising wiper means mounted to said housing and engaging the peripheral circumferential surface of said applicator roller and for wiping off any liquid at a particular area of engagement on said applicator roller surface before said applicator roller particular point returns from a position exterior of said housing to a position interior of said housing.

18. Apparatus as recited in claims 1, 7, or 15 wherein said roller surface on which the liquid film is deposited is a rigid peripheral surface.

19. Apparatus as recited in claim 18 wherein said applicator rollers consists of a single applicator roller.

20. Apparatus for applying liquid to plants, comprising a liquid applicator roller for contacting plants and transferring liquid from the roller surface to the plants;

a liquid reservoir;

means for transferring liquid from said reservoir to said applicator roller so that a film of liquid is deposited on said applicator roller surface just before it contacts plants;

a housing for mounting said roller for rotation about a given axis, and covering said roller at the top and sides but being open at the bottom to allow the peripheral surface of the roller to rotate out of the housing open bottom, and for mounting said liquid transferring means;

a drive wheel;

means for mounting said drive wheel to said housing so that it is rotatable about an axis parallel to the axis of rotation of said applicator roller; and surface means formed on said applicator roller and drive wheel for effecting rotation of said applicator roller in response to rotation of said drive wheel, driven by said drive wheel.

21. Apparatus as recited in claim 20 wherein said surface means comprises means for effecting rotation of said liquid applicator in a direction opposite to the direction of rotation of said drive wheel.

22. Apparatus as recited in claim 21 wherein said surface means comprises a raised portion formed on said applicator roller and extending circumferentially around said roller, and an exterior peripheral circumferentially extending portion of said drive wheel; and wherein said apparatus further comprises means defining a slot in said housing along a portion thereof adjacent said drive wheel through which said raised portion of said applicator roller extends to contact said drive wheel.

23. Apparatus as recited in claim 22 wherein said drive wheel has a substantially larger diameter than said applicator roller, and further comprising means for mounting said housing opposite said drive wheel so that said housing is spaced from the ground, and so that said applicator roller is rotatable about a horizontal axis and is spaced from the ground, while said drive wheel engages the ground.

24. Apparatus as recited in claim 23 wherein said housing mounting means includes a pair of horizontally spaced substantially horizontally elongated plates mounted to said housing on an opposite side thereof as said drive wheel, and having at least one bore formed in each.

25. Apparatus as recited in claim 24 wherein said housing mounting means further includes a pair of wheels and a pair of axles, said axles being operatively connected to said plates at said bores, and said wheels being rotatable about said axles and in contact with the ground.

26. Apparatus as recited in claim 25 further comprising a handle mounted to said plates and upwardly extending therefrom.

27. Apparatus as recited in claim 24 wherein said housing mounting means further comprises a pair of levers, one mounted at one end thereof to each of said plates at said bore, and means for mounting said levers at the other ends thereof to a tractor tool bar.

28. Apparatus as recited in claims 20 or 22 wherein said means for mounting said drive wheel to said housing comprises first and second bracket arms, both arms being mounted at one end thereof to said drive wheel so that said drive wheel is rotatable with respect thereto, and pivotally mounted at the other end thereof to said liquid applicator roller at said axis of rotation thereof so that said liquid applicator roller is rotatable with respect thereto; and adjustable means for mounting said first arm intermediate its ends to said housing so that said first arm is held stationary with respect to said housing and may be so held stationary at a plurality of different points corresponding to different heights of the housing with respect to said axis of rotation of said drive wheel.

29. Apparatus as recited in claim 20 wherein said applicator roller comprises a hard plastic tube, having the ends thereof plugged and with spindles extending axially outwardly therefrom for receipt by said housing and rotation with respect thereto.

30. Apparatus as recited in claim 20 wherein said means for transferring liquid from said reservoir to said applicator roller comprises: means defining a liquid pool in said housing extending substantially the entire width of said housing and the entire length of said roller; a conduit leading from said reservoir to said liquid pool; valve means associated with said conduit for controlling flow of liquid through said conduit to said pool in response to the level of liquid in said pool; and transfer means disposed in said liquid pool for transferring liquid from said pool to the surface of said applicator roller as said applicator roller rotates therepast.

31. Apparatus as recited in claim 30 wherein said transfer means comprises a sponge disposed in said liquid pool and extending outwardly from said liquid pool into engagement with the peripheral surface of said applicator roller.

32. Apparatus as recited in claim 31 wherein said means for transferring liquid further comprises a tube extending from said conduit, in liquid-communication therewith, above and substantially along the entire width of said sponge adjacent the portion of said sponge contacting said applicator roller, and means defining a plurality of small holes in the bottom of said tube for dripping liquid from said tube onto said sponge.

33. Apparatus as recited in claim 30 wherein said transfer means comprises first and second transfer rollers, said first roller mounted for rotation in said pool and said second roller mounted for rotation between said pool and said applicator roller, and in surface-to-surface contact with said first roller and said applicator roller, both said transfer rollers being rotatable about axes parallel to the axis of rotation of said applicator roller.

34. Apparatus as recited in claim 30 wherein said liquid pool is aerated adjacent the side of said applicator roller opposite said drive wheel, and wherein said valve means comprises means for maintaining the level of liquid in said pool at about the same horizontal level as the axis of rotation of said applicator roller.

35. Apparatus as recited in claim 20 further comprising wiper means mounted to said housing and engaging the peripheral circumferential surface of said applicator roller and for wiping off any liquid at a particular area of engagement on said applicator roller surface before said applicator roller particular point returns from a position exterior of said housing to a position interior of said housing.

* * * * *